(12) United States Patent
Toeroe et al.

(10) Patent No.: US 10,229,005 B2
(45) Date of Patent: Mar. 12, 2019

(54) PATTERN BASED CONFIGURATION METHOD FOR MINIMIZING THE IMPACT OF COMPONENT FAILURES

(71) Applicants: Maria Toeroe, Montreal (CA); Parsa Pourali, Waterloo (CA)

(72) Inventors: Maria Toeroe, Montreal (CA); Parsa Pourali, Waterloo (CA)

(73) Assignee: TELEFONAKTIEBOLAGET LM ERICSSON (PUBL), Stockholm (CH)

(*) Notice: Subject to any disclaimer, the term of this patent is extended or adjusted under 35 U.S.C. 154(b) by 224 days.

(21) Appl. No.: 15/112,973

(22) PCT Filed: Jan. 23, 2014

(86) PCT No.: PCT/IB2014/058504
§ 371 (c)(1),
(2) Date: Jul. 20, 2016

(87) PCT Pub. No.: WO2015/110867
PCT Pub. Date: Jul. 30, 2015

(65) Prior Publication Data
US 2016/0335161 A1    Nov. 17, 2016

(51) Int. Cl.
| G06F 11/00 | (2006.01) |
| G06F 11/14 | (2006.01) |
| G06F 11/30 | (2006.01) |
| G06F 9/445 | (2018.01) |
| G06F 8/60 | (2018.01) |

(52) U.S. Cl.
CPC .............. *G06F 11/142* (2013.01); *G06F 8/60* (2013.01); *G06F 9/44505* (2013.01);
(Continued)

(58) Field of Classification Search
CPC .. G06F 11/142; G06F 11/1428; G06F 11/143; G06F 11/3051; G06F 2201/805; G06F 2201/85
See application file for complete search history.

(56) References Cited

U.S. PATENT DOCUMENTS

| 6,601,233 B1 | 7/2003 | Underwood |
| 6,944,759 B1 | 9/2005 | Crisan |
(Continued)

FOREIGN PATENT DOCUMENTS

WO    2009/111799 A2    9/2009

OTHER PUBLICATIONS

Kanso et al., Automatic Annotation of Software Configuration Models with Service Recovery Information, IEEE Ninth International Conference on Dependable, Autonomic and Secure Computing, 2011, pp. 121-128.
(Continued)

*Primary Examiner* — Joseph D Manoskey
(74) *Attorney, Agent, or Firm* — Julie Dufort; Ericsson Canada Inc.

(57) ABSTRACT

A configuration is generated for a software that is to be deployed for providing high service availability to satisfy configuration requirements. One or more configuration patterns are identified, each of which specifies a set of attribute values and an actual recovery action for a failed component as a configuration option of the software. The unchangeable attribute values of the software are matched with the configuration patterns to obtain a matching configuration pattern, whose actual recovery action incurs a smallest component failure recovery impact zone. The matching configuration pattern is selected as at least a portion of the configuration of the software. Then the changeable attribute values of the software are set to the corresponding attribute values of the matching configuration pattern to satisfy the configuration requirements.

20 Claims, 7 Drawing Sheets

(52) U.S. Cl.
CPC ........ *G06F 11/143* (2013.01); *G06F 11/3051* (2013.01); *G06F 2201/805* (2013.01); *G06F 2201/85* (2013.01)

(56) References Cited

U.S. PATENT DOCUMENTS

| | | | |
|---|---|---|---|
| 8,738,968 B2 | 5/2014 | Kanso et al. | |
| 2009/0164767 A1 | 6/2009 | Kanso et al. | |
| 2009/0164832 A1* | 6/2009 | Kanso | G06F 8/65 714/1 |
| 2009/0171705 A1* | 7/2009 | Bobak | G06Q 10/06 705/80 |
| 2009/0216697 A1 | 8/2009 | Beaty et al. | |
| 2011/0320574 A1* | 12/2011 | Felts | G06F 9/44505 709/220 |
| 2012/0151443 A1* | 6/2012 | Rohde | G06F 9/44 717/121 |
| 2012/0233501 A1 | 9/2012 | Kanso et al. | |

OTHER PUBLICATIONS

Kanso et al., Automating Service Availability Analysis: an Application to a Highly Available Media-Streaming Service, Seventh International Conference on Software Security and Reliability Companion, 2013, pp. 94-101.
Kanso et al., Configuration-Based Service Availability Analysis for Middleware Managed Applications, 2012, 18 pages.
Service Availability Forum Application Interface Specification, SAI-AIS-AMF-B.04.01, Availability Management Framework, Sep. 30, 2011, 452 pages.
Kanso et al., Generating AMF Configurations from Software Vendor Constraints and User Requirements, International Conference on Availability, Reliability and Security, 2009, pp. 454-461.
International Search Report from corresponding application PCT/IB2014/058504.

* cited by examiner

US 10,229,005 B2

PATTERN BASED CONFIGURATION METHOD FOR MINIMIZING THE IMPACT OF COMPONENT FAILURES

TECHNICAL FIELD

Embodiments of the invention relate to the Availability Management Framework (AMF).

BACKGROUND

The Availability Management Framework (AMF) manages the availability of application services based on the configuration of the software to be deployed. This configuration is also referred to as the AMF configuration. Requirements for the application services are specified in a set of configuration requirements. For a given set of configuration requirements, a number of configurations can be generated and the one which best meets the requirements is deployed. In the context of high availability, the configuration that best meets the requirements is the one providing the highest availability. However, generating all of the possible configurations and selecting the best may not be feasible under every circumstance.

AMF configurations can be automatically generated by a configuration generation process. Input to the configuration generation process includes the Configuration Requirements (CR) describing the services to be provided by the system, Entity Types Files (ETFs) describing the available software for providing the services, and cluster information describing the deployment cluster on which the software is to be deployed. After validating the input, the configuration generation process goes through several steps, including but not limited to: selecting ETF prototypes; creating AMF types from the selected ETF prototypes; creating AMF entities for the AMF types; setting the attributes of AMF entities and the allocation of the AMF entities to cluster nodes.

An existing configuration generation process generates multiple configurations to satisfy the same requirements as the process explores possible options in a combinatorial manner. In each of the configuration generation steps described above, the combinatorial solution explores all the options; however only one configuration is needed.

There are a number of reasons for the multiple possible options at each step, and, therefore, for the resulting multiple valid configurations. For example, one reason is that multiple ETF prototypes may be available to provide the same service and can be selected. Another reason is that multiple AMF types can be derived from the same ETF prototype. Yet another reason is that different numbers of AMF entities can be created for the same AMF type. Moreover, AMF entities can be allocated to cluster nodes in many ways.

In each of the configuration generation steps described above, the existing configuration generation process selects prototypes, types or entities based on a subset of criteria, but not all the criteria. Accordingly, some options selected by some criteria in an earlier step may lead to no result as they are pruned in a later step by other criteria; other options that are pruned in an earlier step by some criteria may have improved significantly by later choices and become the solution if they were not pruned.

SUMMARY

According to one embodiment, a computer-implemented method is provided for generating a configuration of a software to be deployed for providing high service availability to satisfy configuration requirements. The method comprises the steps of: identifying, by a computer system, one or more configuration patterns, each of which specifies a set of attribute values and an actual recovery action for a failed component as a configuration option of the software; matching unchangeable attribute values of the software with the configuration patterns to obtain a matching configuration pattern whose actual recovery action incurs a smallest component failure recovery impact zone; selecting the matching configuration pattern as at least a portion of the configuration of the software; and setting changeable attribute values of the software to corresponding attribute values of the matching configuration pattern to satisfy the configuration requirements.

According to another embodiment, a computer system is provided to generate a configuration of a software to be deployed for providing high service availability to satisfy configuration requirements. The computer system comprises a memory to store a data structure which further stores a set of configuration patterns. The computer system further comprises one or more processors coupled to the memory. The one or more processors are adapted to: identify one or more of the configuration patterns, each of which specifies a set of attribute values and an actual recovery action for a failed component as a configuration option of the software; match unchangeable attribute values of the software with the configuration patterns to obtain a matching configuration pattern whose actual recovery action incurs a smallest component failure recovery impact zone; select the matching configuration pattern as at least a portion of the configuration of the software; and set changeable attribute values of the software to corresponding attribute values of the matching configuration pattern to satisfy the configuration requirements.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
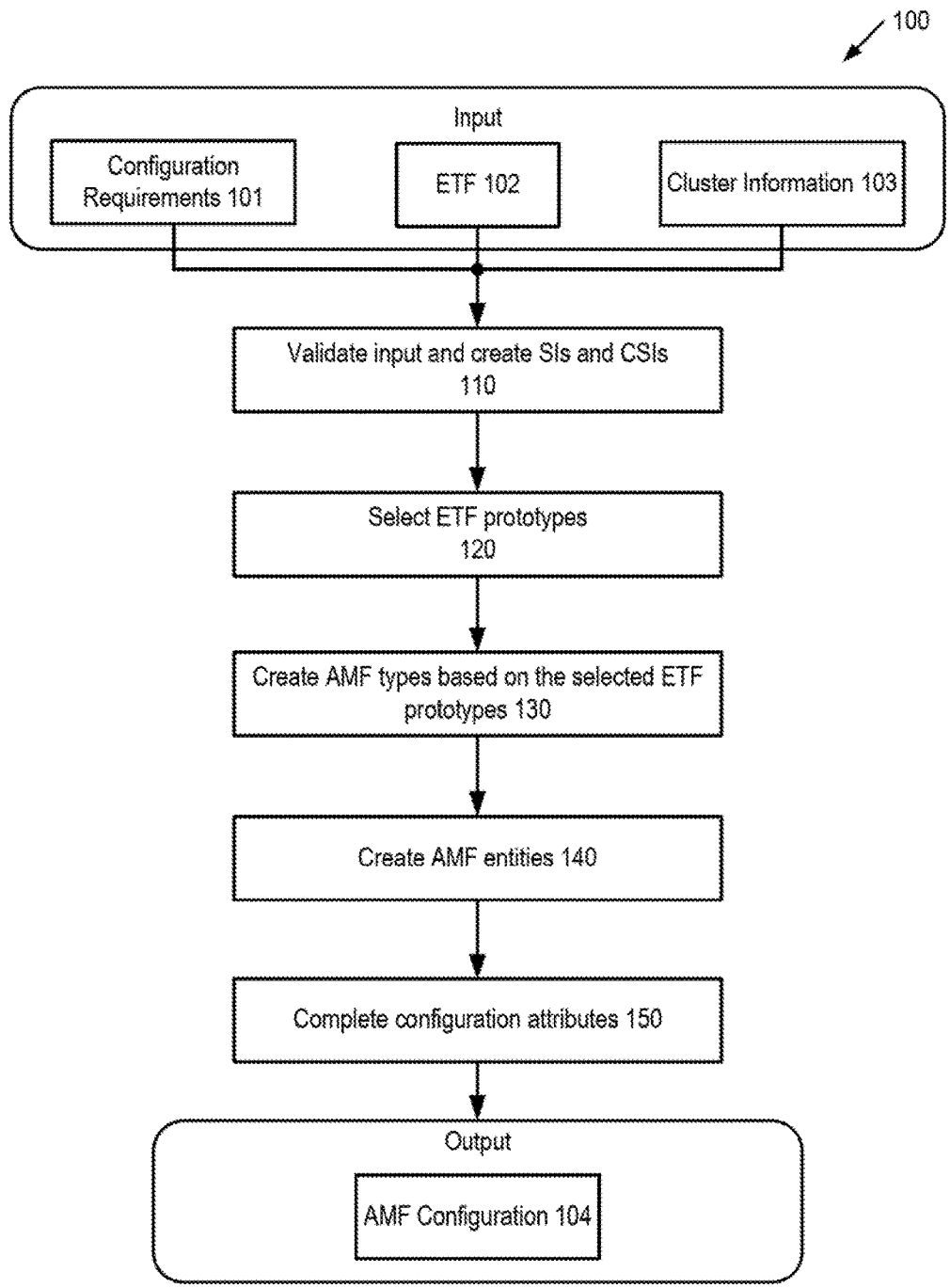
FIG. 1 illustrates a process for generating an AMF configuration according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide an automatic configuration generation process that maximizes system availability. The process utilizes a pattern based configuration design method that reduces the configuration choices by determining the values of changeable attributes during the intermediate steps of the process. As a result, the component failure recovery impact zone (also referred to as the "recovery impact zone" or "impact zone;" that is, the scope of impact caused by the recovery of a failed component) is minimized, and, therefore, the achievable service availability is maximized. In one embodiment, configuration patterns are defined in tables with rows of increasing impact zones. Each configuration pattern specifies a set of attribute values. The software that is to be configured and deployed also has a list of attribute values provided by the software vendor. A vendor-provided attribute value for a given attribute can be an unchangeable attribute value or a changeable attribute value. An unchangeable attribute value cannot be changed during the configuration generation process, while a changeable attribute value can be changed during the configuration generation process. The configuration design method compares the unchangeable attributes with the table to select the applicable rows, among which the top row with the smallest impact zone is selected. The selection of a row in turn determines the setting for one or more of the changeable attributes. It is understood that in alternative embodiments within the scope this disclosure, data structures different from the tables may be used.

The configuration generation process associates a recovery impact zone with each set of configuration artifacts (e.g., ETF prototypes, AMF types and AMF entities). A configuration pattern specifies the attribute values of a set of the configuration artifacts. During the configuration generation process, some of the configuration patterns that do not meet the configuration requirements can be discarded. That is, the configuration patterns having impact zones greater than what is requested by the configuration requirements can be eliminated. The remaining ones are ranked according to their respective impact zones for subsequent choices in the configuration generation process.

Before describing the configuration design method, it is useful to explain some terminologies used in the context of AMF. The configuration requirements specify the characteristics of the services provided by an application to be configured. An AMF configuration specifies the organization of the logical entities that compose the applications under the control of AMF. An AMF configuration includes AMF entities and AMF entity types (also referred to as AMF types). AMF types define the characteristics shared by multiple AMF entities. AMF entities are logical entities representing services and software/hardware service provider's resources. The basic entities are called components and represent resources capable of supporting the workload imposed by functionalities of the application's services. This workload is referred to as component service instance (CSI). Components are aggregated into service units (SU), which are logical entities representing the basic redundancy unit for AMF. The workloads of the components contained in an SU are aggregated into a service instance (SI), which represents the workload assigned to the SU. SUs are further grouped into service groups (SG) to protect a set of the provided SIs according to a redundancy model (i.e. No-Redundancy, 2N, N+M, NWay, or NWay-Active, as defined by the AMF specification). Finally, AMF applications combine one or more SGs. Each SU is deployed on an AMF node and the set of all AMF nodes forms the AMF cluster.

With respect to the software to be deployed (e.g., software provided by vendors), the information about each software component (such as its version, the services it provides and depends on, and possible restrictions) is specified by the vendor in terms of prototypes in a file called the Entity Types File (ETF). These prototypes are also referred to as the ETF prototypes. Once the ETF prototypes are determined, the AMF types and AMF entities can be created from the ETF prototypes.

FIG. 1 illustrates a configuration generation process 100 according to one embodiment. The process 100 receives configuration requirements 101, ETF 102 and cluster information 103 as input. After the input data is verified, the process 100 generates SIs and CSIs (block 110), and selects appropriate ETF prototypes that satisfy the configuration requirements (block 120). Thereafter, the AMF types are generated based on the selected ETF prototypes (block 130). The AMF entities, such as components, SUs, SGs and applications are then generated (block 140). After the process completes the determination of configuration attributes (block 150), an AMF configuration 104 is generated. In one embodiment, the process 100 may be performed by a computer system, such as the computer system 800 to be described with reference to FIG. 8. The configuration design method, which will be described in detail later, can be applied to different stages of the configuration generation process to improve the quality of the generated configuration.

Figure 2:
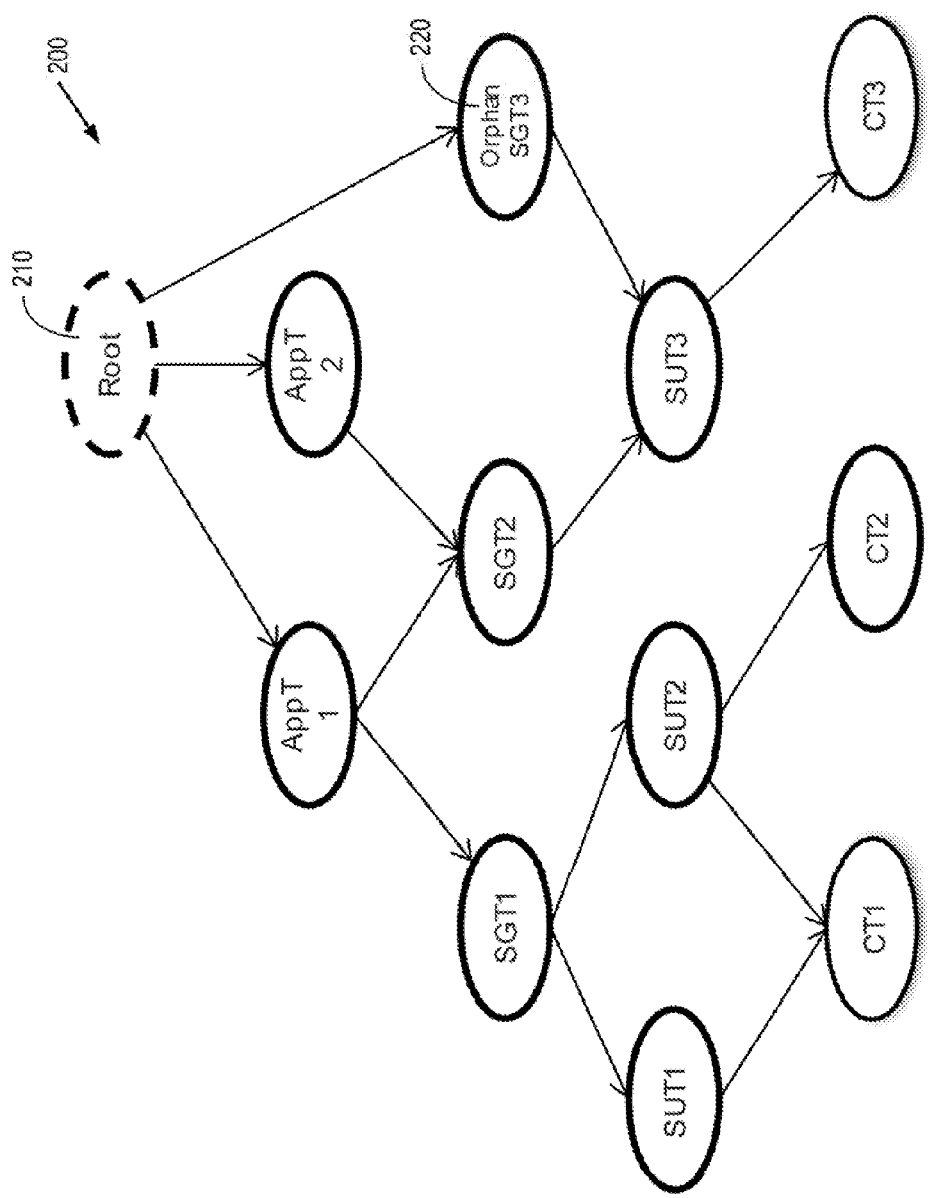
FIG. 2 illustrates the hierarchy of ETF prototypes according to one embodiment of the invention.

The ETF prototype selection step of block 120 identifies one or more ETF prototypes that satisfy the input configuration requirements 101. In one embodiment, the available collection of ETF prototypes can be represented as a directed acyclic graph (DAG) 200 as shown in the example of FIG. 2. In this example, the DAG 200 includes a Root node 210 which represents the parent of all the other nodes. The nodes of the DAG 200 represent ETF prototypes, whereas the edges represent the relations among these prototypes. Examples of the ETF prototypes include application prototype (AppT), SG prototype (SGT), SU prototype (SUT) and component prototype (CT). The DAG 200 is constructed from the ETF files (e.g., the ETF 102 of FIG. 2), each ETF file describing one or more component prototypes with their services and their upper-level prototypes grouped into an application prototype. Except for the application prototype, all the other prototypes may have more than one parent prototype (e.g., SUT3 may be used in SGT2 or in Orphan SGT3). Since not all prototypes are mandatory in the ETF, any prototype may have the Root 210 as its parent; e.g., Orphan SGT3 220.

As described herein, a "type stack" is a stack of ETF prototypes. An "administrative domain" is a set of services provided for the same client. For multiple administrative domains serving multiple clients, each client is unaware of other client's services. Thus, different configurations do not share application instances; e.g., if two clients want database service, two separate database application instances will be generated, one for each client. For a given administrative domain, one or more application prototypes may provide the requested services through one or more SG prototypes. In this case for each possible combination of prototypes that satisfies the configuration requirements, a stack of ETF prototypes can be built that contains a set of component prototypes at the bottom level. The component prototypes may be grouped by SU prototypes that in turn may belong to SG prototypes, which may belong to one or more application prototypes. It is noted that a type stack has only one valid combination; that is, if the same component prototype is used in two SU prototypes, then two type stacks will be built, one for each SU prototypes. While in the DAG 200 an ETF prototype may have multiple parents, in the type stacks these multiple parents are resolved to all applicable combinations. Based on how many suitable candidate prototypes are available at each level, multiple type stacks may be built. In one embodiment, a type stack can be incomplete; that is, it may contain only the prototypes for the lower levels.

Figure 3:
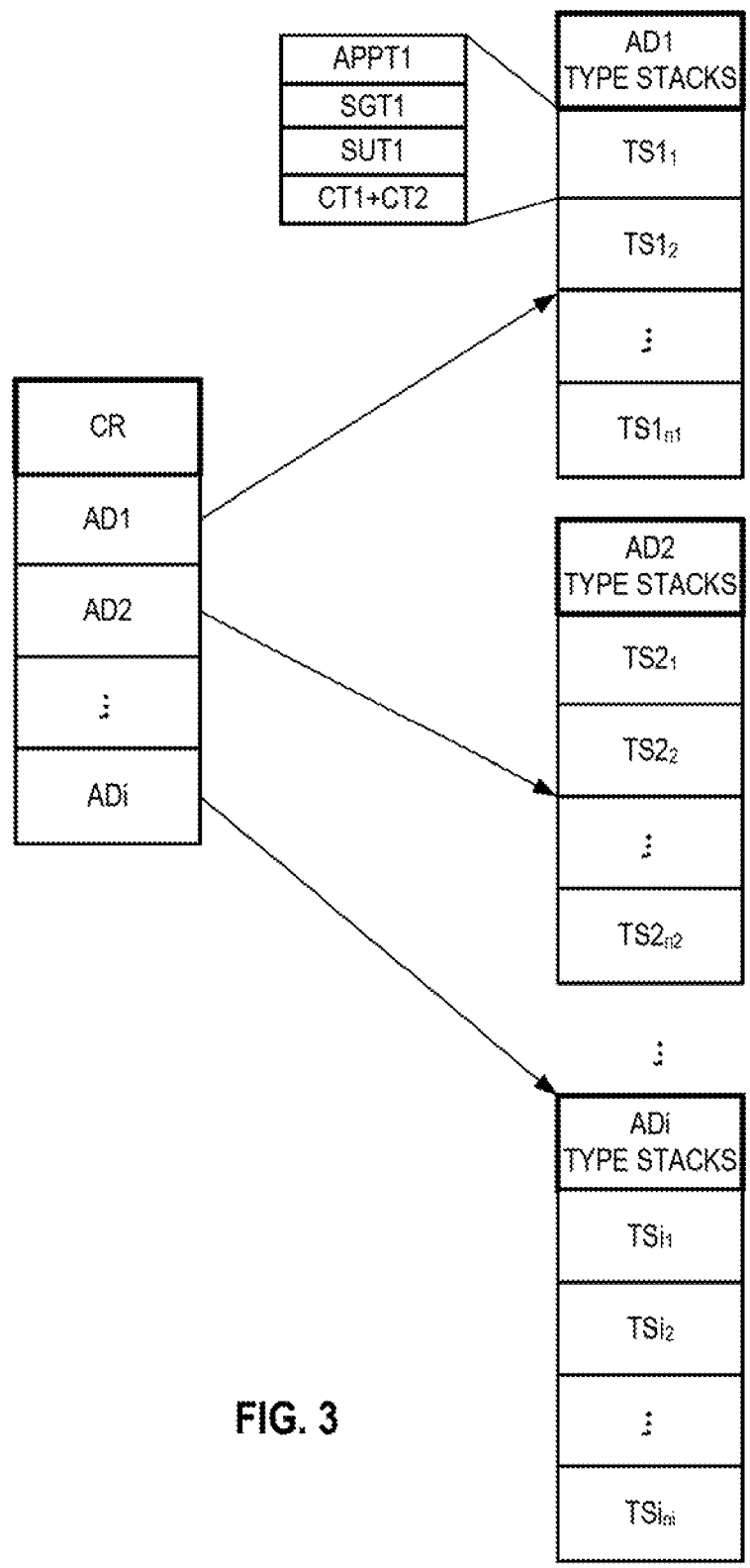
FIG. 3 illustrates multiple type stacks that can be generated for the same configuration requirements according to one embodiment of the invention.

FIG. 3 illustrates an example of multiple type stacks that can be generated for the same configuration requirements. In this example, for administrative domain AD1 the first type stack that satisfies the configuration requirements is $TS1_1$, which includes AppT1, SGT1, SUT1, CT1 and CT2 prototypes. Alternatively, each of the other type stacks $TS1_2, \ldots, TS1_{n1}$ (which are created using the ETF prototypes of FIG. 2) in AD1 can also be used to satisfy the configuration requirements. Similarly, each administrative domain AD2 up to $AD_i$ (where i can be any positive integer) can use any of its type stacks to satisfy the configuration requirements. To form a configuration, the type stacks across these administration domains are combined.

Figure 4:
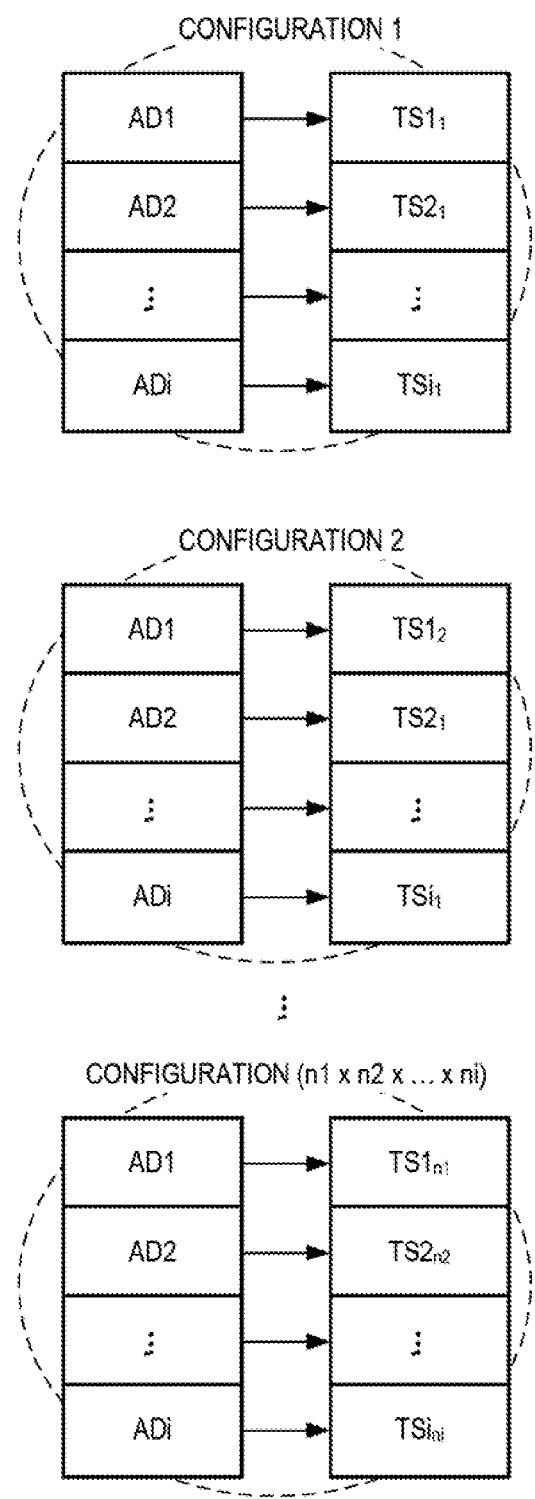
FIG. 4 illustrates the formation of a configuration according to one embodiment of the invention.

An example of forming a configuration is illustrated in FIG. 4. A configuration may be formed by taking one type stack from each administration domain. For example, configuration 1 may be formed by $TS1_1$, $TS2_1$, $TSi_1$; configuration 2 may be formed by $TS1_2$, $TS2_1$, $TSi_1$; . . . ; and configuration (n1×n2× . . . ×ni) may be formed by $TS1_{n1}$, $TS2_{n2}, \ldots, TSi_{ni}$. In this example, the number of configurations is (n1×n2× . . . ×ni), where 'x' means multiplication. The number of configurations depends on the number of type stacks found in each administrative domain.

As described above, although multiple configurations can be generated as eligible options for satisfying the configuration requirements, only one configuration is needed. The number of configuration options increase further when AMF types and AMF entities are created. For AMF types, their attributes are determined when the AMF types are created from each of the ETF prototypes, or when the AMF types are created to complement one or more missing levels in the type stacks. Thus, one can create an AMF type for each eligible value of each attribute, multiplying the number of possible configurations by the number of eligible values of each attribute. For AMF entities, when they are created for each AMF type, their number is not fixed but can be selected from a range. As in the case of the type attributes, the entity attributes also have eligible ranges, thus further increasing the number of configuration options. Evaluating the service availability provided by each configuration option can be time and computationally consuming.

According to embodiments of the invention, a pattern based configuration method provides attribute settings that minimize the recovery impact zone for each component prototype in the type stacks; thus maximizing the availability that these stacks can provide. A similar approach can be applied at the AMF type creation and then at the AMF entity creation stages. If the ETF type stacks are incomplete, i.e., do not cover all the levels, AMF types are created to complement the missing levels in the type stacks, and their attributes can be set according to the pattern minimizing the recovery impact zone. Setting the attribute values at an earlier stage (e.g., the ETF prototype stage) reduces the number of configuration options without jeopardizing the level of service availability provided by the generated configuration.

The configuration design method also identifies the actual recovery action for each of the type stacks. The scope of an actual recovery action determines a recovery impact zone. The type stack with an impact zone greater than requested in the configuration requirements is eliminated. The remaining type stacks are ranked based on their impact zones. When selecting a type stack during the configuration generation process, the type stacks with a smaller impact zone are prioritized in the selection to provide the requested availability.

In one embodiment, the configuration design method can be embedded in the configuration generation process 100 of FIG. 1 to reduce the number of configuration options to those that provide the highest service availability.

In one embodiment, the ETF prototypes are organized as a multi-level hierarchy that has a number of attributes affecting service availability. Similarly, the AMF types, as well as the AMF entities, are also organized as a multi-level hierarchy that has a number of attributes affecting service availability. At each level, the attributes that impact service availability are identified and the configuration settings that minimize the recovery impact zone of component failure are defined. These configuration settings are used as patterns to maximize the service availability. When identifying the configuration settings that minimize the recovery impact zone, it is assumed that the information about the applicable failure rates and the recommended recovery actions is provided for the component prototypes.

In the following, the pattern based configuration method is described using an example of the ETF prototypes. It is understood that the method is also applicable to AMF types and AMF entities. The method sets the relevant attributes such that service availability is maximized within the limitations of the given software implementations.

Figure 5:
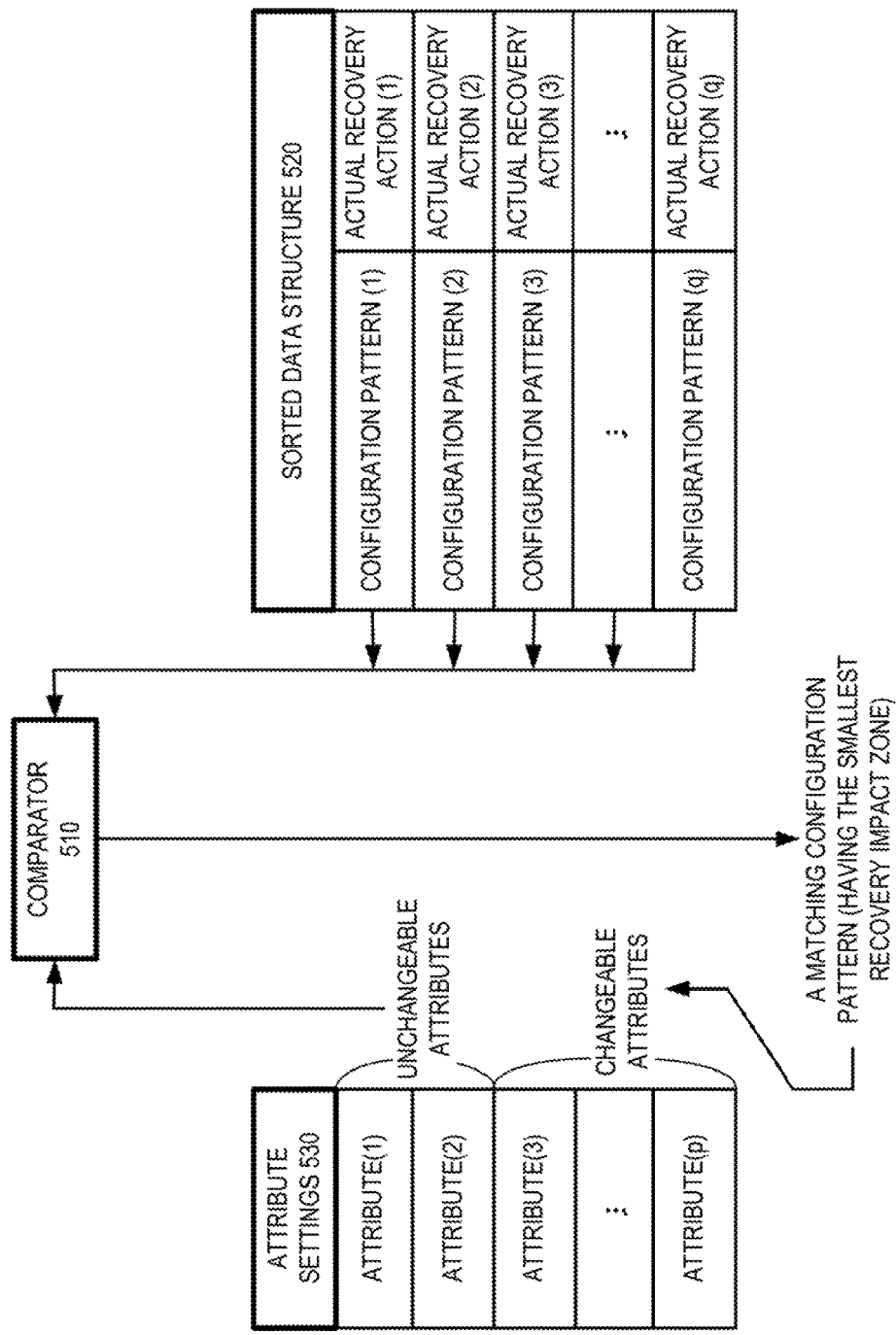
FIG. 5 illustrates a mechanism for performing a pattern based configuration design method that minimizes the recovery impact zone according to one embodiment of the invention.

FIG. 5 illustrates a mechanism for performing the pattern based configuration design method according to one embodiment. To perform the pattern based configuration method, the component prototypes are analyzed first. The attributes which increase the recovery impact zone after a component fails are identified. By increasing the impact zone, more components are involved in the recovery; therefore, all of the service instances assigned to these components become impacted. Thus, by minimizing the number of impacted service instances, the availability of services can be maximized. To reduce the number of impacted service instances, the component prototypes are analyzed to determine the actual recovery AMF would execute. The actual recovery action indicates the recovery impact zone. The results of the analysis can be organized into a data structure; e.g., a sorted data structure 520 such as one or more tables whose rows are sorted in the order of increasing recovery impact zones. In one embodiment, each row contains a configuration pattern, which represents one of the configuration options for the software to be deployed. Each configuration pattern specifies a set of attribute values and an actual recovery action for a failed component.

Typically, software vendors preset or recommend at least some of the attribute values for the software that they provide. These attribute settings 530 include unchangeable attributes and changeable attributes. For an ETF prototype, the change of an attribute value may be allowed depending on the setting of this attribute in the ETF files provided by the software vendor. The ETF file describes the limitations of the software implementation. For example, if the software vendor sets the component restartability attribute to true or does not provide a setting (i.e., a NULL value), this attribute may be set to either false or true; that is, the attribute setting is changeable. If the software vendor sets the component restartability attribute to false in the ETF file, this attribute setting is unchangeable; that is, this attribute is to remain false in the ETF prototype, as well as in the AMF types and AMF entities derived from it. This is because the "false" attribute setting for restartability indicates that restart is not an appropriate recovery action to restore the services of a failed component running a given software implementation (i.e., a failed component derived from the given component prototype). For similar reasons, if the software vendor sets the service group prototype AutoRepair attribute to false, this value cannot be changed. However, the AutoRepair attribute setting is changeable if its value is true or NULL.

In one embodiment, the software to be deployed has at least an attribute to which two or more attribute values can be assigned. Some of these attribute values may be unchangeable, and some of them may be changeable. When an attribute is assigned an unchangeable attribute value, it cannot change its assigned value. Assigning an unchangeable attribute value to an attribute results in a larger component failure recovery impact zone than assigning a changeable attribute value to the same attribute. Furthermore, a changeable attribute value can be changed into a value that results in a larger component failure recovery impact zone, but cannot be changed into a value that results in a smaller component failure recovery impact zone. For example, an attribute can have three values a, b and c, and these three values result in three recovery impact zones A, B and C, respectively, with A<B<C. This means that if the attribute is set to a, it can be changed to b or c, because B and C are both greater than A. If the attribute is set to c, it cannot be changed at all. If the attribute is set to b, then it can be changed to c since C>B, but cannot be changed to a, because A<B. In the context of the table (e.g., the sorted data structure 520), a changeable attribute cannot be set to a value that results in moving upwards in the rows of the table (i.e., resulting in a smaller recovery impact zone).

Thus, if by any reason, the recovery impact zone is increased through an attribute setting, this recovery impact zone cannot be reduced through a change of the attribute setting. As it is not known where the failure manifests within this increased impact zone, the entire increased zone needs to be captured to ensure a successful recovery.

In one embodiment, a comparator 510 compares the unchangeable attributes in the attribute settings 530 with the configuration patterns in the sorted data structure 520. The comparator 510 searches for a matching configuration pattern from the top rows toward the bottom (i.e., in the order of increasing recovery impact zones) until a matching configuration pattern is found. The first configuration pattern that matches the unchangeable attributes is the matching configuration pattern that has the smallest recovery impact zone when a component fails. This matching configuration pattern is selected. Then the changeable attributes in the software's attribute settings 530 is set to the values of the matching configuration pattern, which results in the smallest recovery impact zone.

The same principle applies when the configuration patterns are used for AMF types and AMF entities. In one embodiment, the configuration patterns can be matched to the attribute settings of ETF prototypes, AMF types and AMF entities to provide configuration options for these configuration artifacts. Alternatively or additionally, the attribute values of ETF prototypes can be used as reference values for deriving the corresponding attribute values for the AMF type and the AMF type.

In one embodiment, the sorted data structure 520 may be organized as a table with multiple sections. For example, each section may contain the configuration patterns for one or more redundancy models. Under each section, there may be one or more subsections with each subsection containing the configuration patterns for a different recommended recovery action. A recommended recovery action can mutate into an actual recovery action through recovery altering attributes. These recovery altering attributes may alter a triggered recommended recovery into a different recovery more suitable for the given context. Examples of recovery altering attributes include component disable restart, SU failover, SG auto-repair, etc. In alternative embodiment, the sorted data structure 520 may be one or more tables that have redundancy model and recommended recovery action as two or more of the attributes listed in the table columns.

In the following, Table 1 presents the configuration patterns and the corresponding actual recovery actions with respect to the relevant configuration attributes for the No-redundancy, 2N and N+M redundancy models. Table 2 presents the same information as it applies to the Nway and the Nway-Active redundancy models.

In Table 1 and Table 2, the columns show the relevant configuration attributes at each level such as the component (CT), service unit (SUT) and the service group (SGT) levels, and the actual recovery action. The rows show the possible settings of each of the configuration attributes and the recovery action applicable for the given combination of attribute setting. The recommended recovery actions, which include component restart and the component failover, are considered in separate subsections of the tables. Within each subsection of a recommended recovery, the rows are sorted according to the increasing impact zones of the applicable actual recovery.

Other recommended recovery actions for a component are at the node, application or cluster level, but their impact zones are not changed by configuration attributes. Therefore, the recommended recovery actions at the node, application and cluster levels are not shown in the tables. In the tables, 'X' indicates the attribute values that do not impact the given recovery action in the given context of the other attribute setting.

TABLE 1

Actual recovery action for No Red., 2N, N + M redundancy models

N + M, 2N and No-redundancy

| | CT Disable Restart | SUT SU FailOver | SGT SuProbCountMax | SGT CompProbCountMax | SGT AutoRepair | Actual Recovery Action |
|---|---|---|---|---|---|---|
| | | | Component Restart Recommended Recovery Action | | | |
| 1 | False | X | X | >0 | X | Component(Restart) |
| 2 | False | X | >0 | 0 | True | SU (Restart) |
| 3 | False | X | 0 | 0 | True | SU (Failover) |
| 4 | True | X | X | X | X | SU (Failover) |
| 5 | False | X | X | 0 | False | SU (Failover) |
| | | | Component Failover Recommended Recovery Action | | | |
| 6 | X | X | X | X | X | SU (Failover) |

TABLE 2

Actual recovery action for NWay and NWay-Active redundancy models

Nway and Nway-Active

| | CT Disable Restart | SUT SU FailOver | SGT SuProbCountMax | SGT CompProbCountMax | SGT AutoRepair | Actual Recovery Action |
|---|---|---|---|---|---|---|
| | | | Component Restart Recommended Recovery Action | | | |
| 1 | False | X | X | >0 | X | Component(Restart) |
| 2 | False | False | X | X | True | Component & Siblings (Failover) |
| 3 | False | X | >0 | 0 | True | SU (Restart) |
| 4 | False | X | 0 | 0 | True | SU (Failover) |
| 5 | True | X | X | X | X | SU (Failover) |
| 6 | False | X | X | 0 | False | SU (Failover) |
| | | | Component Failover Recommended Recovery Action | | | |
| 7 | False | False | X | X | True | Component & Siblings (Failover) |
| 8 | X | True | X | X | X | SU (Failover) |
| 9 | True | False | X | X | True | SU (Failover) |
| 10 | X | False | X | X | False | SU (Failover) |

Table 1 and Table 2 show the attributes by their general meaning and not the specific attribute names. Therefore, the tables apply to the ETF prototypes, AMF types and AMF entities as well.

Using these tables, the configuration attributes can be set so that the actual recovery action has the minimal impact. By comparing the attribute settings provided in the ETF file with the rows of the table, the top row among those that match is selected. Then the changeable attributes are set to the values presented by this selected row. The example below helps to illustrate how the comparison is made.

Consider the type stack TS1 from the example of FIG. 3 with the following attributes provided in the ETF file by the software vendor:

TABLE 3

Attribute Values of a Type Stack

| | |
|---|---|
| Redundancy Model | N-Way |
| CT RecoveryOnError | Component Restart |
| CT DisableRestart | NULL |

TABLE 3-continued

Attribute Values of a Type Stack

| | |
|---|---|
| Redundancy Model | N-Way |
| SUT SU FailOver | False |
| SGT SuProbCountMax | NULL |
| SGT CompProbCountMax | 3 |
| SGT AutoRepair | True |

Since the CT DisableRestart attribute is provided as Null by the vendor, this attribute can be set to either true or false. In Table 2, rows 1 and 5 are applicable. If this attribute is set to false (row 1), the actual recovery action will be component restart; that is, only the component will be impacted in case of its failure. If this attribute is set to true (row 5), the actual recovery become SU failover; that is, the whole SU will be impacted. Thus, the table guides a system integrator or administrator to set the attribute to false (which provides the recovery impact zone of component level) rather than setting it to true (which increases the recovery impact zone to the SU).

In Table 3, the SGT SuProbCountMax attribute is NULL which is also changeable. However, this attribute plays no role in this example. Hence, there is no recommendation for its setting in Table 2, as its value is provided as 'X' in both rows 1 and 5.

As described above with reference to FIG. 1, the configuration generation process 100 has three separate stages for generating a configuration for ETF prototypes, AMF types and AMF entities. Once an attribute is set, this set attribute value can typically be carried on in the subsequent stages. Therefore, if an attribute is set for an ETF prototype, this set attribute value can be mapped to a corresponding attribute value for the AMF types and the AMT entities. The pattern based configuration design method can be performed at any of these three stages; the earlier it is done the better, as fewer potential configuration options remain to be handled.

However, some information may not be available at an early stage. For example, the SU and SG levels are not mandatory in the ETF prototypes; thus, attribute settings for these levels may not be made if they are absent in ETF prototypes. In this case, the attribute settings can be postponed to the next stage when AMF types are created; alternatively, the attribute settings can be made partially for the available attributes at the ETF prototype stage and the rest can be made at the AMF type stage.

In addition, as discussed above, some attribute values are changeable while others are not. For example, if the restart attribute is disabled in a component type, it cannot be enabled later. But if the restart attribute is enabled, it can be disabled later under other considerations; e.g., because of different optimization considerations or because of a particular combination of features. In this case, changing the value of an attribute does not incur a new minimalization process of the recovery impact zone.

For example, a component prototype (ECT) has its Disable Restart attribute (disableRestart) set to True in the ETF. This attribute value is unchangeable. Thus, the AMF component types (ACT1 and ACT2) derived from ECT also have their equivalent saAmfCtDefDisableRestart attribute set to True, and so do all the AMF components of this AMT component type (e.g., c1, c2 of ACT1 and c3, c4, c5 of ACT2) for their saAmfCompDisableRestart attribute.

However, if ECT has its attribute set to False, then the saAmfCtDefDisableRestart of ACT1 can still be set to True. The same attribute for ACT2 can be kept False, if the components of ACT1 and ACT2 are to be used differently. Accordingly, c1, c2 of ACT1 will have their saAmfCompDisableRestart attribute set to True, while c3, c4, c5 of ACT2 will be False or changed to True if necessary.

The ETF prototypes, AMF types and AMF entities have attributes that typically map into each other one-to-one, with one exception for SG entities. The following illustrates some of the mappings at each level (listed as ETF prototype/AMF type/AMF entities attributes):

TABLE 4

Attribute Mapping for ETF prototypes,
AMF types and AMF entities

Figure 6:
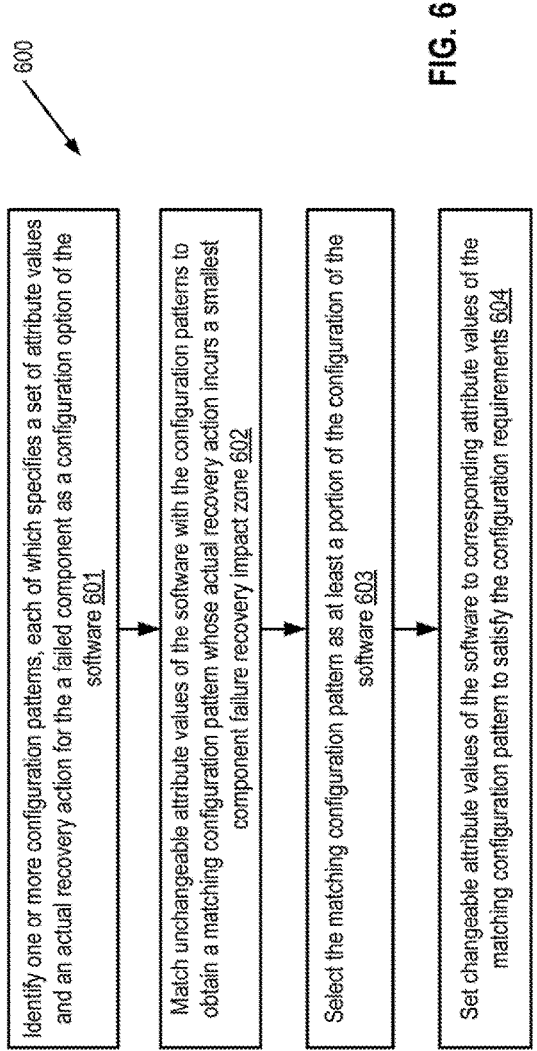
FIG. 6 is a flow diagram illustrating a method for generating a software configuration according to one embodiment of the invention.

Component level recoveryOnError/saAmfCtDefRecoveryOnError/
saAmfCompRecoveryOnError
disableRestart/saAmfCtDefDisableRestart/saAmfCompDisableRestart TABLE 4-continued Attribute Mapping for ETF prototypes,
AMF types and AMF entities SU level suFailOver/saAmfSutDefSUFailover/saAmfSUFailover
SG level redModel/saAmfSgtRedundancyModel/—
autoRepairOption/saAmfSgtDefAutoRepair/saAmfSGAutoRepair
compProbation.counterMax/saAmfSgtDefCompRestartMax/
saAmfSGCompRestartMax
suProbation.counterMax/saAmfSgtDefSURestartMax/
saAmfSGSuRestartMax FIG. 6 is a flow diagram illustrating a method 600 for generating a configuration of a software to be deployed for providing high service availability to satisfy configuration requirements. In one embodiment, the method 600 may be the configuration design method described above. Referring to FIG. 6, in one embodiment, the method 600 begins with a computer system identifying one or more configuration patterns, each of which specifies a set of attribute values and an actual recovery action for a failed component as a configuration option of the software (block 601). The unchangeable attribute values of the software are matched with the configuration patterns to obtain a matching configuration pattern, whose actual recovery action incurs a smallest component failure recovery impact zone (block 602). The matching configuration pattern is selected as at least a portion of the configuration of the software (block 603). Then the changeable attribute values of the software are set to the corresponding attribute values of the matching configuration pattern to satisfy the configuration requirements (block 604).

Figure 7:
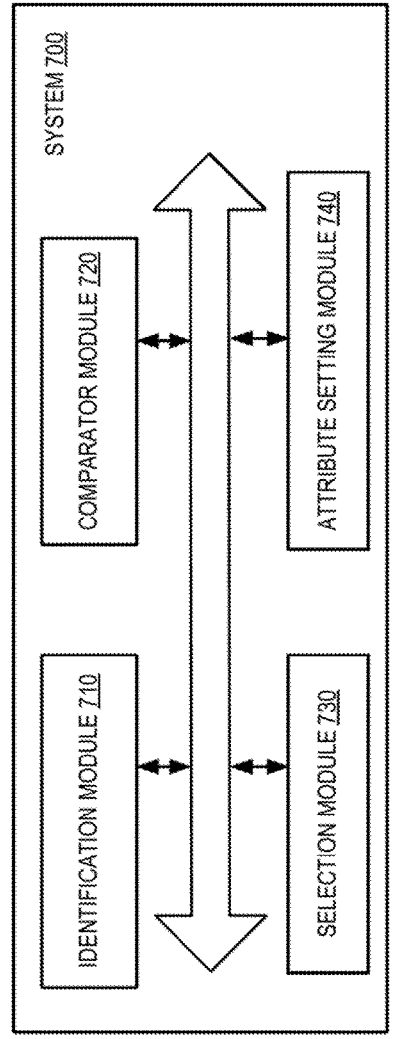
FIG. 7 illustrates a system for performing the method of FIG. 6 according to one embodiment of the invention.
Figure 8:
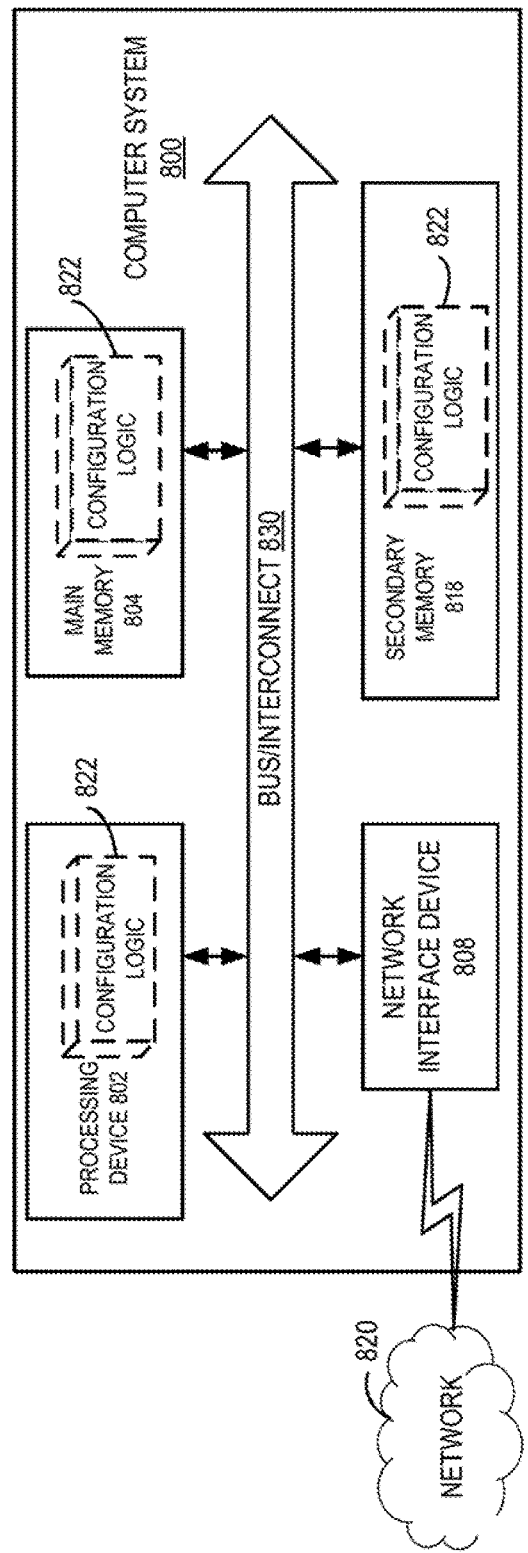
FIG. 8 illustrates a diagrammatic representation of a computer system according to one embodiment of the invention.

The method 600 may be performed by hardware (e.g., circuitry, dedicated logic, programmable logic, microcode, etc.), software (e.g., instructions run on a processing device), or a combination thereof In one embodiment, the method 600 may be performed by a system 700 of FIG. 7 and/or by a computer system 800 of FIG. 8.

FIG. 7 illustrates a system 700 for generating a configuration of a software to be deployed for providing high service availability to satisfy configuration requirements. In one embodiment, the system 700 performs the method 600 of FIG. 6. The system 700 comprises an identification module 710 configured to identify one or more of the configuration patterns that have a same redundancy model and a same recommended recovery action for the failed component as the software, and a comparator module 720 configured to match unchangeable attribute values of the software with the configuration patterns to obtain a matching configuration pattern whose actual recovery action incurs a smallest component failure recovery impact zone. The system 700 further comprises a selection module 730 configured to select the matching configuration pattern as at least a portion of the configuration of the software, and an attribute setting module 740 configured to set changeable attribute values of the software to corresponding attribute values of the matching configuration pattern to satisfy the configuration requirements.

FIG. 8 illustrates a diagrammatic representation of a machine in the exemplary form of the computer system 800 within which a set of instructions, for causing the machine to perform any one or more of the methodologies discussed herein, may be executed. In one embodiment, the computer system 800 may be part of a network node (e.g., a router, switch, bridge, controller, base station, etc.). In one embodiment, the computer system 800 may operate in a cloud computing environment where multiple server computers in one or more service centers collectively provide computing services on demand. The computer system 800 may be a server computer, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 800 includes a processing device 802. The processing device 802 represents one or more general-purpose processors, each of which can be: a microprocessor, a central processing unit (CPU), a multicore system, or the like. The processing device 802 may also be one or more special-purpose processing devices such as an application specific integrated circuit (ASIC), a field programmable gate array (FPGA), a digital signal processor (DSP), network processor, or the like. In one embodiment, the processing device 802 is adapted or operative to execute the operations of a configuration logic 822 which contains instructions executable by the processing device 802 to perform the method 600 of FIG. 6 and the configuration generation process 100 of FIG. 1. In one embodiment, the processing device 802 may host a set of virtual machines adapted to execute the operations of the configuration logic 822.

In one embodiment, the processor device 802 is coupled to one or more memory devices such as: a main memory 804 (e.g., read-only memory (ROM), flash memory, dynamic random access memory (DRAM), etc.), a secondary memory 818 (e.g., a magnetic data storage device, an optical magnetic data storage device, etc.), and other forms of computer-readable media, which communicate with each other via a bus or interconnect 830. The memory devices may also include different forms of read-only memories (ROMs), different forms of random access memories (RAMs), static random access memory (SRAM), or any type of media suitable for storing electronic instructions. In one embodiment, the memory devices may store the code and data of the configuration logic 822. In the embodiment of FIG. 8, the configuration logic 822 may be located in one or more of the locations shown as dotted boxes and labeled by the reference numeral 822. In alternative embodiments the configuration logic 822 may be located in other location(s) not shown in FIG. 8.

In one embodiment, the computer system 800 is adapted or operative to perform the method 600 of FIG. 6 for generating a configuration of a software to be deployed for providing high service availability to satisfy configuration requirements. In one embodiment, the one or more memory devices of the computer system 800 stores a data structure which further stores a set of configuration patterns. The processing device 802, having one or more processors coupled to the memory devices, is adapted or operative to identify one or more of the configuration patterns, each of which specifies a set of attribute values and an actual recovery action for a failed component as a configuration option of the software; match unchangeable attribute values of the software with the configuration patterns to obtain a matching configuration pattern whose actual recovery action incurs a smallest component failure recovery impact zone; select the matching configuration pattern as at least a portion of the configuration of the software; and set changeable attribute values of the software to corresponding attribute values of the matching configuration pattern to satisfy the configuration requirements.

The computer system 800 may further include a network interface device 808. A part or all of the data and code of the configuration logic 822 may be transmitted or received over a network 820 via the network interface device 808.

In one embodiment, the configuration logic 822 can be implemented using code and data stored and executed on one or more computer systems (e.g., the computer system 800). Such computer systems store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory) and transitory computer-readable transmission media (e.g., electrical, optical, acoustical or other form of propagated signals—such as carrier waves, infrared signals). A non-transitory computer-readable medium of a given computer system typically stores instructions for execution on one or more processors of that computer system.

The operations of the diagrams of FIGS. 1 and 6 have been described with reference to the exemplary embodiments of FIGS. 7 and 8. However, it should be understood that the operations of the diagrams of FIGS. 1 and 6 can be performed by embodiments of the invention other than those discussed with reference to FIGS. 7 and 8, and the embodiments discussed with reference to FIGS. 7 and 8 can perform operations different than those discussed with reference to the diagrams. While the diagrams of FIGS. 1 and 6 show a particular order of operations performed by certain embodiments of the invention, it should be understood that such order is exemplary (e.g., alternative embodiments may perform the operations in a different order, combine certain operations, overlap certain operations, etc.).

It is to be understood that the above description is intended to be illustrative, and not restrictive. Many other embodiments will be apparent to those of skill in the art upon reading and understanding the above description. Accordingly, the specification and drawings are to be regarded in an illustrative sense rather than a restrictive sense.

What is claimed is:

1. A computer-implemented method for generating a configuration of a software to be deployed for providing high service availability to satisfy configuration requirements, the method comprising the steps of:
- identifying, by a computer system, one or more configuration patterns, each of which specifies a set of attribute values and an actual recovery action for a failed component as a configuration option of the software;
- creating a table comprising the one or more configuration patterns, corresponding actual recovery actions and component failure recovery impact zones;
- matching unchangeable attribute values of the software with the configuration patterns of the table until a matching configuration pattern whose actual recovery action incurs a smallest component failure recovery impact zone is found;
- selecting the matching configuration pattern as at least a portion of the configuration of the software; and
- setting changeable attribute values of the software to corresponding attribute values of the matching configuration pattern to satisfy the configuration requirements.

2. The method of claim 1, wherein the step of identifying further comprises the step of identifying the one or more configuration patterns that have a same redundancy model and a same recommended recovery action for the failed component as the software.

3. The method of claim 1, further comprising the steps of: mapping the unchangeable attribute values and the changeable attribute values of Entity Types File (ETF) prototypes specified in the matching configuration pattern to corresponding attribute values of Availability Management Framework (AMF) types; and creating AMF entities based on the AMF types.

4. The method of claim 1, wherein the configuration patterns provide configuration options for ETF prototypes, AMF types and AMF entities.

5. The method of claim 1, wherein the table has rows that are ranked in an increasing order of component failure recovery impact zones, wherein each row contains one of the configuration patterns and a corresponding actual recovery action; the method further comprising searching for the matching configuration pattern from top toward bottom of the rows until the matching configuration pattern is found.

6. The method of claim 1, further comprising the step of: eliminating the configuration patterns having component failure recovery impact zones greater than requested by the configuration requirements.

7. The method of claim 1, wherein each configuration pattern specifies the set of attribute values for one or more levels of a type stack hierarchy.

8. The method of claim 7, wherein the type stack hierarchy includes one or more of a component level, a service unit level, a service group level and an application level.

9. The method of claim 1, further comprising the step of: analyzing component prototypes based on a recommended recovery action and one or more attributes to determine the actual recovery action.

10. The method of claim 1, wherein the software has at least an attribute, which, when assigned an unchangeable attribute value, cannot change its assigned value, and wherein assigning the unchangeable attribute value to the attribute results in a larger component failure recovery impact zone than assigning a changeable attribute value to the attribute.

11. A system adapted to generate a configuration of a software to be deployed for providing high service availability to satisfy configuration requirements, the system comprising:
a memory to store a data structure which further stores a set of configuration patterns; and
one or more processors coupled to the memory, the one or more processors adapted to:
identify one or more of the configuration patterns, each of which specifies a set of attribute values and an actual recovery action for a failed component as a configuration option of the software;
create a table comprising the one or more configuration patterns, corresponding actual recovery actions and component failure recovery impact zones;
match unchangeable attribute values of the software with the configuration patterns of the table until a matching configuration pattern whose actual recovery action incurs a smallest component failure recovery impact zone is found;
select the matching configuration pattern as at least a portion of the configuration of the software; and
set changeable attribute values of the software to corresponding attribute values of the matching configuration pattern to satisfy the configuration requirements.

12. The system of claim 11, wherein the identified one or more configuration patterns have a same redundancy model and a same recommended recovery action for the failed component as the software.

13. The system of claim 11, wherein the one or more processors are further adapted to:
map the unchangeable attribute values and the changeable attribute values of Entity Types File (ETF) prototypes specified in the matching configuration pattern to corresponding attribute values of Availability Management Framework (AMF) types; and
create AMF entities based on the AMF types.

14. The system of claim 11, wherein the configuration patterns provide configuration options for ETF prototypes, AMF types and AMF entities.

15. The system of claim 11, wherein
the table has rows that are ranked in an increasing order of component failure recovery impact zones, wherein each row contains one of the configuration patterns and a corresponding actual recovery action; and
wherein the one or more processors are further adapted to search for the matching configuration pattern from top toward bottom of the rows until the matching configuration pattern is found.

16. The system of claim 11, wherein the one or more processors are further adapted to eliminate the configuration patterns having component failure recovery impact zones greater than requested by the configuration requirements.

17. The system of claim 11, wherein each configuration pattern specifies the set of attribute values for one or more levels of a type stack hierarchy.

18. The system of claim 17, wherein the type stack hierarchy includes one or more of a component level, a service unit level, a service group level and an application level.

19. The system of claim 11, wherein the one or more processors are further adapted to analyze component prototypes based on a recommended recovery action and one or more attributes to determine the actual recovery action.

20. The system of claim 11, wherein the software has at least an attribute, which, when assigned an unchangeable attribute value, cannot change its assigned value, and wherein assigning the unchangeable attribute value to the attribute results in a larger component failure recovery impact zone than assigning a changeable attribute value to the attribute.

* * * * *